(12) United States Patent
Ziegler

(10) Patent No.: US 8,930,960 B2
(45) Date of Patent: Jan. 6, 2015

(54) METHODS AND SYSTEMS FOR OBJECT INTERPRETATION WITHIN A SHARED OBJECT SPACE

(75) Inventor: Carsten Ziegler, Walldorf (DE)

(73) Assignee: SAP SE, Walldorf (DE)

( * ) Notice: Subject to any disclaimer, the term of this patent is extended or adjusted under 35 U.S.C. 154(b) by 1549 days.

(21) Appl. No.: 12/000,845

(22) Filed: Dec. 18, 2007

(65) Prior Publication Data

US 2009/0157739 A1    Jun. 18, 2009

(51) Int. Cl.
| G06F 3/00 | (2006.01) |
| G06F 9/44 | (2006.01) |
| G06F 9/46 | (2006.01) |
| G06F 13/00 | (2006.01) |
| G06F 17/30 | (2006.01) |

(52) U.S. Cl.
CPC ............................... *G06F 17/30607* (2013.01)
USPC ............................ 719/312; 719/313; 719/310

(58) Field of Classification Search
None
See application file for complete search history.

(56) References Cited

U.S. PATENT DOCUMENTS

| 4,325,120 A  * | 4/1982 | Colley et al. ................... 711/202 |
| 2003/0154239 A1* | 8/2003 | Davis et al. ..................... 709/201 |
| 2005/0097567 A1* | 5/2005 | Monnie et al. ................. 719/315 |

OTHER PUBLICATIONS www.yoda.arachsys.com/java/passing.html, Parameter passing in Java—by reference or by value?, Feb. 1, 2002.*
The Java Virtual Machine Specification, Frank Yellin, Addison-Wesley, Sep. 1996.*
"What is an Object", Aug. 6, 2006, Oracle, 2 pages.*
Fields should usually be private, Aug. 5, 2006, Java Practices, pp. 1-3.*

* cited by examiner

*Primary Examiner* — Craig Dorais
(74) *Attorney, Agent, or Firm* — Finnegan, Henderson, Farabow, Garrett & Dunner, LLP

(57) ABSTRACT

Methods and systems are provided for creating and using a shared object space to interpret objects. In one exemplary embodiment, a method is provided that includes partitioning a memory area of a server. The method may also include creating an object, wherein the created object contains the data needed for performing the function of the object, and providing an interpretation routine for interpreting the object. The method may further include storing the created object and the interpretation routine in the partitioned memory area and defining application access to the partitioned memory area.

18 Claims, 8 Drawing Sheets

FIG. 3

| Generated Comparison Function | |
|---|---|
| Attribute id | Attribute description |
| Technical id | 3100000 |
| Comp_id | Less than |
| Val1_id | Age of customer |
| Val2_id | 18 |
| Result_id | No |

310

METHODS AND SYSTEMS FOR OBJECT INTERPRETATION WITHIN A SHARED OBJECT SPACE

DETAILED DESCRIPTION

1. Technical Field

The present invention generally relates to the field of software design and programming. More specifically, the invention relates to methods and systems for interpreting an object within a shared object space.

2. Background Information

In object-oriented programming, classes may be used as a method to accelerate the development of an application. Generally, a "class" may be defined as a group of related data, meta-data, and functions. That is, a class defines the rules by which objects behave. An "object" is a concrete realization (i.e., instance) of a class that consists of data and the operations associated with that data. Objects may act as the building blocks of a software application. In turn, the software application may comprise business rules. A business rule may be generally defined as logical statements or instructions of what to do in different distinct situations. For example, a simple business rule may set forth that if a customer is less than eighteen years old, then return "no." Within this example, the objects that comprise the business rule are a comparison function, the customer, the constant value eighteen years, and the constant value "no."

In general, each object is a unit of code capable of receiving and sending messages, as well as processing data. However, the data itself is not stored within the object, but is instead stored in a separate database or repository. The separately stored data is said to be "attributed" to the object. That is, when an object is created, it is comprised of attributes. These attributes may be generally defined as pointers or indicators of the data that is needed for the object to perform its function.

Processing of objects during the runtime of an application requires instantiating the object (i.e., creating an instance of the object), generating the object, and interpreting the object. Generating the object and interpreting the object is performed by code that may be developed by an application developer. This code, as used herein, is referred to as an "interpretation routine." The process of "generating the object" refers to retrieving the attributes of the object from a database or repository. The process of "interpreting the object" refers to performing the function of the generated object.

A problem with the above interpretation routine process is that the instantiating of the object occurs within the buffer memory of the application and, as a result, may drain system resources and reduce overall performance. Additionally, the process of generating the object also occurs within the buffer memory. For example, in a conventional application runtime process, a first object may communicate with a second object in order to retrieve data needed for generation. When the first object is instantiated, an interpretation routine is called to generate the first object and to perform the functionalities of the first object. Additionally, when the first object communicates with the second object and the second object is instantiated, another interpretation routine may be called to generate the second object and to perform the functionalities of the second object. Therefore, because each object is instantiated and generated within the buffer memory of a calling application, the runtime performance of the application is inefficient.

Accordingly, there is a need for methods and systems that are capable of instantiating and interpreting an object within a shared object space.

SUMMARY

In accordance with the principles of the present invention, as embodied and broadly described herein, methods and systems are provided for interpreting an object within a shared object space.

According to one embodiment, a method is provided for creating a shared object space. The method comprises partitioning a memory area of a server. The method also comprises creating an object, wherein the created object contains the data needed for performing the function of the object, and providing an interpretation routine for interpreting the object. The method further comprises storing the created object and the interpretation routine in the partitioned memory area and defining application access to the partitioned memory area.

In another embodiment of the invention, a method is provided for using a shared object space to interpret objects. The method comprises initializing an application call routine to an object and searching a shared object space for a generated version of the called object. The method also comprises allowing the application access to the shared object space and the generated version of the called object if the generated version of the called object is found in the shared object space. The method further comprises instantiating the generated version of the called object in the shared object space and mapping the generated version of the called object to a customized interpretation routine stored in the shared object space. Additionally, the method comprises interpreting the generated version of the called object in the shared object space.

Consistent with another embodiment of the invention, a shared object space system is disclosed. The shared object space system comprises a partitioned memory area of a server accessible by one or more applications. The shared object space system also comprises a generated object and an interpretation routine for interpreting the generated object. The shared object space system further comprises a shared object interpreter component for managing the access of the one or more applications to the partitioned memory area.

According to yet another embodiment of the invention, a method is disclosed for using a shared object space to interpret objects. The method comprises initializing an application call routine to an object and searching a shared object space for a function module containing a generated version of the called object and a customized interpretation routine. The method also comprises allowing the application access to the shared object space and the function module if the function module object is found in the shared object space. The method further comprises instantiating the generated version of the called object in the shared object space and interpreting the generated version of the called object in the shared object space using the customized interpretation routine.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of several further features disclosed below in the detailed description.

BRIEF DESCRIPTION OF THE DRAWINGS

The accompanying drawings, which are incorporated in and constitute a part of this specification, show features of implementations consistent with the present invention and, together with the description, help explain principles associated with the invention. In the drawings:

FIG. 3 illustrates an example of a generated object, consistent with an embodiment of the present invention;

DESCRIPTION OF THE EMBODIMENTS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
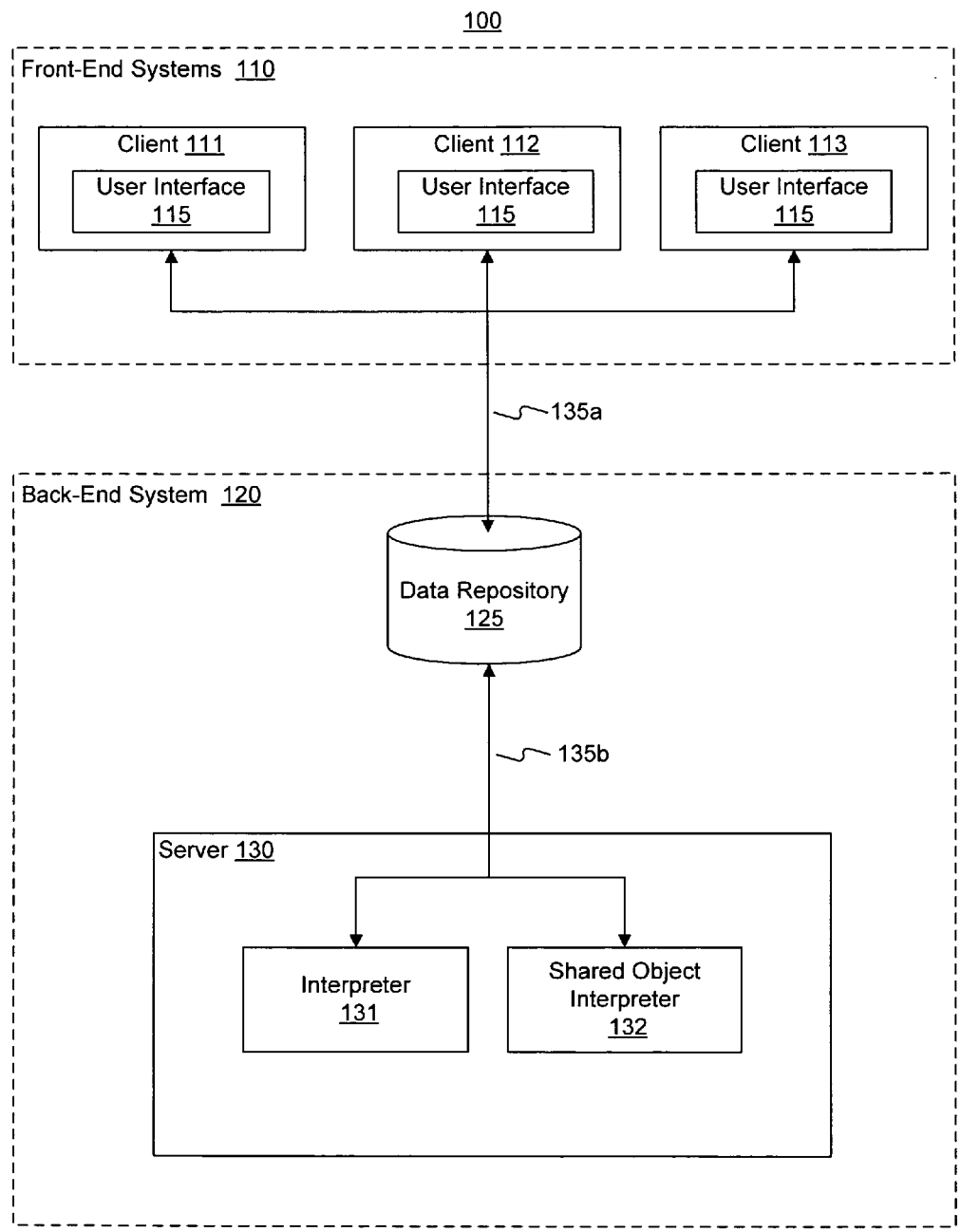
FIG. 1 illustrates a block diagram of an exemplary system, consistent with an embodiment of the present invention.

FIG. 1 illustrates a block diagram of an exemplary system 100. As shown in FIG. 1, system 100 includes clients 111, 112, and 113, collectively referred to herein as front-end systems 110. System 100 may also include a back-end system 120 comprising a data repository 125 and a server 130. The server 130 may in turn comprise an interpreter 131 and a shared object interpreter 132. It should be noted that although FIG. 1 shows a single back-end system 120, a plurality of back-end systems may be used. Moreover, the components depicted in FIG. 1 may be distributed among multiple locations or systems.

Front-end systems 110 may include one or more processors, such as servers or computers, to interface with back-end system 120. Each client 111, 112, and 113 may include a user interface 115, which may provide an interface to allow an authorized user to create or modify an object 200 (see, e.g., FIG. 2), using data stored in data repository 125. User interfaces 115 may communicate with data repository 125 via network connection 135a. Another network connection 135b allows data repository 125 to communicate with server 130 and its components, such as interpreter 131 and shared object interpreter 132.

Network connections 135a and 135b may include, alone or in any suitable combination, a telephony-based network, a local area network (LAN), a wide area network (WAN), a dedicated intranet, wireless LAN, the Internet, and intranet, a wireless network, a bus, or any other communication mechanisms. Further, any suitable combination of wired and/or wireless components and systems may provide network connections 135a and 135b. Moreover, network connections 135a and 135b may be embodied using bi-directional, unidirectional, or dedicated communication links. Network connections 135a and 135b may also implement standard transmission protocols, such as Transmission Control Protocol/Internet Protocol (TCP/IP), Hyper Text Transfer Protocol (HTTP), SOAP, Remote Procedure Call (RPC), or other protocols.

Data repository 125 may comprise meta-data regarding one or more objects 200. Meta-data may be defined as data about data. For example, meta-data may refer to information about the data itself, such as content, quality, condition, origin, size, formatting, characteristics of data, and the like. The extensible Markup Language (XML) is a specific example of meta-data because it is a format used to define other data objects. Meta-data may include a schema. A schema is the organization or structure, such as the organization of a database or the structure of an object 200 in an object oriented program. In object oriented programming, modeling (i.e., the analysis of objects 200 and the identification of the relationships among these objects 200) leads to a schema, which may be stored in data repository 125. The schema may be depicted visually as a structure or a formal text-oriented description (e.g., script).

Figure 2:
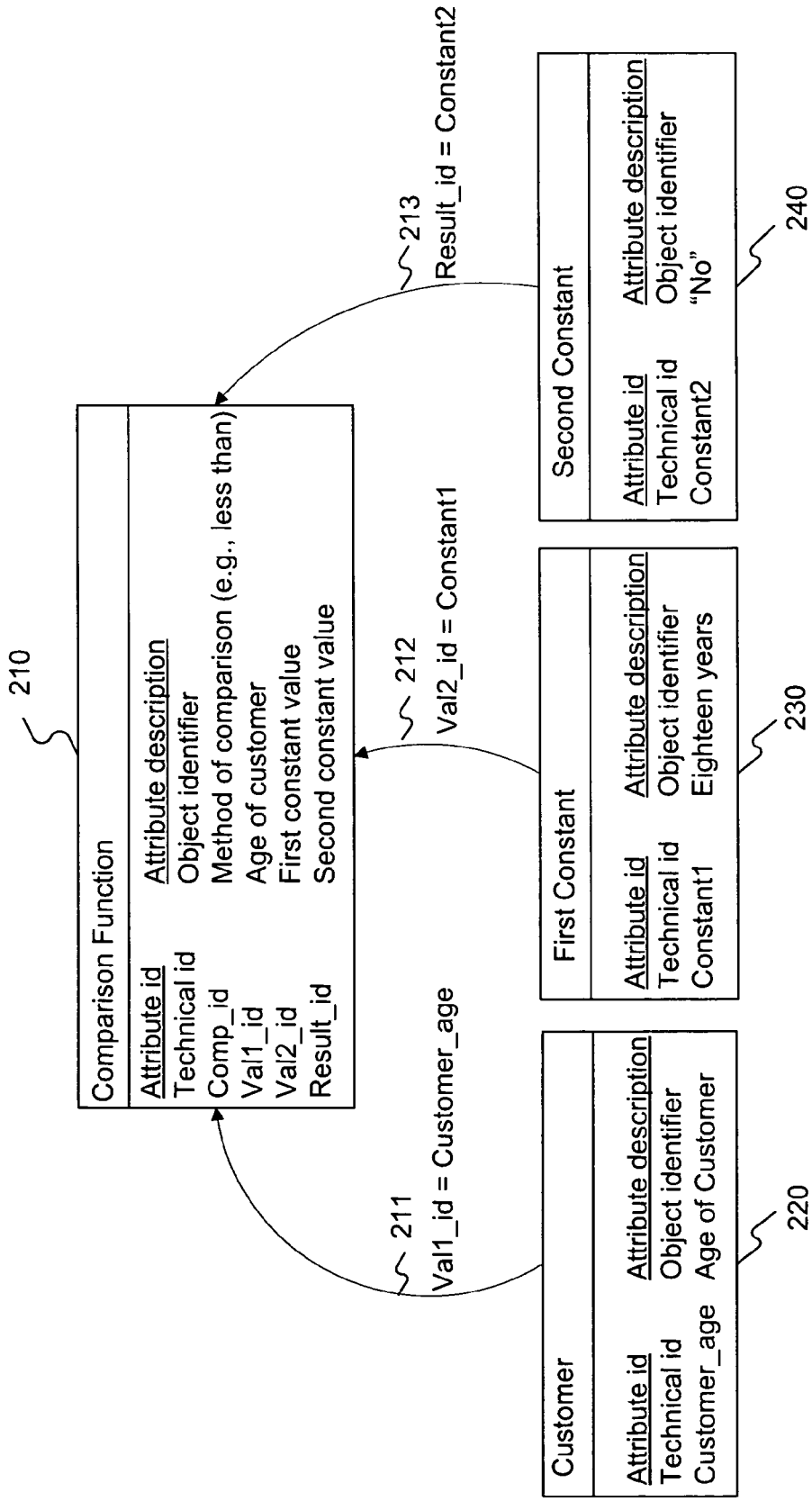
FIG. 2 illustrates an exemplary schema of objects, consistent with an embodiment of the present invention.

FIG. 2 illustrates an exemplary schema of objects 200 stored within data repository 125. The schema may be used by the exemplary business rule, "If a customer is less than eighteen years old, return 'no.'" This business rule may be comprised of a comparison function object 210, a customer object 220, a first constant object 230, and a second constant object 240. Moreover, the schema depicted in FIG. 2 includes keys 211, 212, and 213 that identify the relationships among the objects 210, 220, 230, and 240 that are needed to generate each object. For example, key 211 links objects 210 and 220. In particular, key 211 links the customer age value ("customer_age") to the first value ("val1_id"). Key 212 links objects 230 and 210 by linking the first constant value ("constant1") to the second value ("val2_id"). Key 213 links objects 240 and 210 by linking the second constant value ("constant2) to the result value (result_id).

The schema, which depicts objects 210-240 and how they are associated to one another, may be considered meta-data and stored in data repository 125. Moreover, the schema may be considered a "model" of how to generate the objects 210-240. The model may serve as a template to enable the composition of other models for objects. The models may also be used to create interpretation routines for the objects.

Interpretation routines may, for example, be written in a high-level computer programming language, such as Advanced Business Application Programming (ABAP) (developed by SAP AG), C++, or the like. In general, an interpretation routine is code that is capable of generating and interpreting an object 200 during the runtime of an application. The interpretation process may be performed by interpreter 131 (See FIG. 1), which may map an object 200 to an appropriate interpretation routine. The interpreter 131 may perform the mapping process by retrieving the "technical id" attribute of the object, which may be comprised of a unique string, and searching the repository for an interpretation routine that has been assigned to interpret that particular object. The interpretation routine may be stored in data repository 125 or in a separate repository (not illustrated).

Reproduced below, is an example of an interpretation routine written in the ABAP programming language for comparison function object 210:

```
comparison = factory->get_comparison( comp_id )
val1_id = comparison->get_first_value_id( )
customer_age = customer->get_age( )
val2_id = comparison->get_second_value_id( )
constant = factory->get_constant(val2_id )
value_2 = constant->get_value( )
option = comparison->get_option( )
IF option = 'less than'
  IF customer_age < value2
    result_id = comparison->get_result_id( )
      constant = factory->get_constant( result_id )
    result_value = constant->get_value( )
  ENDIF
ENDIF.
IF option = 'equals'
  IF customer_age = value2
    result_id = comparison->get_result_id( )
      constant = factory->get_constant( result_id )
    result_value = constant->get_value( )
  ENDIF
ENDIF
IF option = 'greater than.
  IF customer_age > value2
    result_id = comparison->get_result_id( )
      constant = factory->get_constant( result_id ).
    result_value = constant->get_value( )
  ENDIF
ENDIF.
```

As illustrated in the above example, the interpretation routine begins by generating the comparison function object 210. That is, attributes of the comparison function object 210 are retrieved from the data repository 125 by instantiating objects 220, 230, and 240. For example, when the customer object 220 is instantiated, another interpretation routine may be called to generate and interpret customer object 220. Additionally, the instantiation of the first constant object 230 and the second constant object 240, may require other interpretation routines to be called to generate and interpret the first constant object 230 and the second constant object 240 as well. Therefore, multiple objects 200 may be instantiated, generated, and interpreted within the buffer memory of a calling application.

After the attributes of the comparison function object 210 are retrieved, the interpretation routine may also interpret the comparison function object 210 by executing code for performing the functionality of the comparison function object 210. In this example, because the comparison to be performed is "less than," the functionality of the comparison function object 210 is performed by the first "if-then" routine of the exemplary interpretation routine reproduced above.

The interpretation routine performs the process of instantiating, generating, and interpreting the comparison function object 210 within a buffer memory of the calling application. As a result, the performance of the application may not be efficient. Consistent with an aspect of the invention, the need to instantiate, generate, and interpret each object 200 within the buffer memory of a calling application may be obviated by the use of a shared object interpreter 132.

Shared object interpreter 132 is capable of performing, within a shared object space 540 (See FIG. 5), a customized interpretation process of a generated object. FIG. 3 illustrates an exemplary generated comparison function object 310. As illustrated in FIG. 3, the attributes of generated comparison function object 310 already contain the data needed for the object to perform its functions. Therefore, as opposed to comparison function object 210, generated comparison function object 310 does not need to communicate with other objects or data repository 125 to retrieve the data for its attributes.

Generated objects, such as generated comparison function object 310 may be created by a developer and stored within the shared object space 540. A customized interpretation routine to perform the functionalities of the generated object may also be created by a developer and stored within the shared object space 540. As used herein, a "customized interpretation routine" refers to an interpretation routine for interpreting a generated object. Shared object interpreter 132 may perform the customized interpretation process of a generated object by mapping the generated object to a stored customized interpretation routine. Shared object interpreter 132 may perform the mapping process by retrieving the identification ("technical id") attribute of the generated object, which may be comprised of a unique string, and searching the shared object space 540 for a customized interpretation routine that matches that identification attribute to interpret that particular generated object.

Reproduced below, is an example of a customized interpretation routine, written in the ABAP programming language, for interpreting generated comparison function object 310:

```
customer_age = customer->get_age( )
IF customer_age < 18
  result_value = 'no'
ENDIF.
```

In contrast to the previous example of an interpretation routine for the comparison function object 210, the above customized interpretation routine for generated comparison function object 310 is much simplified. Data needed for performing the functionalities of the generated object are already included within the generated object and, therefore, the above customized interpretation routine does not need to include instructions to retrieve data from other objects or the data repository 125.

Figure 4:
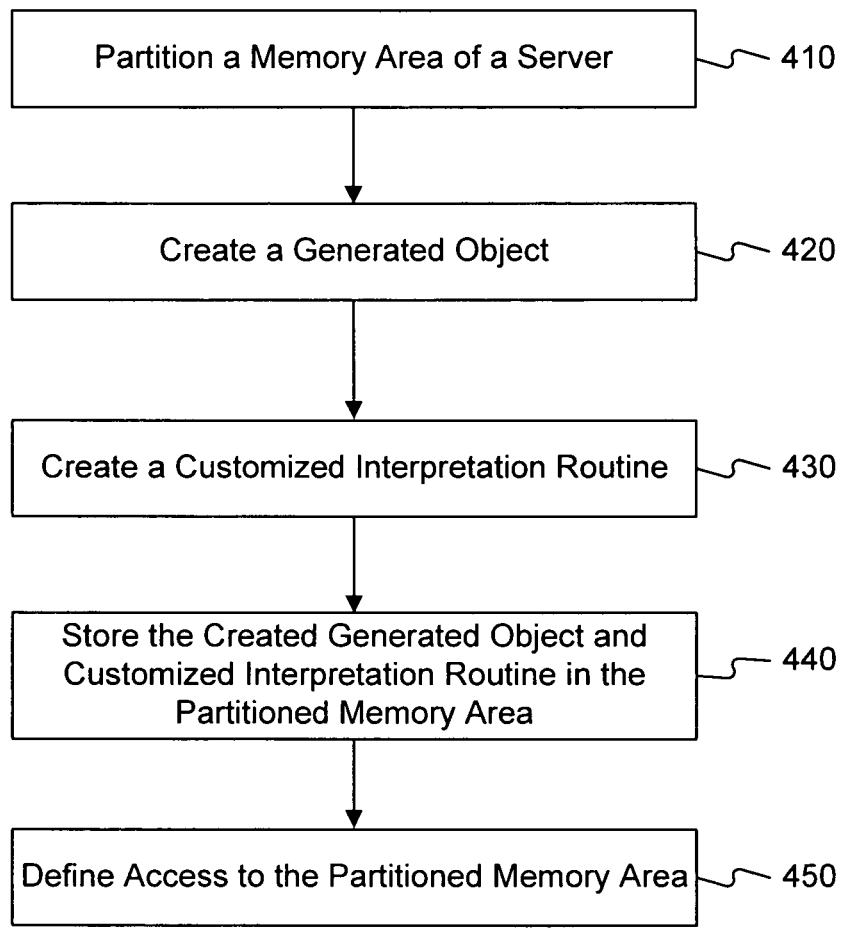
FIG. 4 illustrates a flowchart of an exemplary method for creating a shared object space, consistent with an embodiment of the present invention.

FIG. 4 illustrates a flowchart of an exemplary method associated with creating a shared object space 540. Initially, a user may partition a memory area on server 130 to be used as the shared object space 540 (step 410). The size of the partitioned memory area may vary depending on the size of the generated objects and the customized interpretation routines to be stored in the shared object space 540. Subsequent to partitioning the memory area, a developer may create a generated object (step 420). The developer may also create a customized interpretation routine needed to interpret the generated object (step 430). The created generated object and customized interpretation routine may be stored in the shared object space 540 and may be accessed by one or more applications (step 440).

Access to the shared object space 540 may be defined and regulated through the inclusion of administrative information within the shared object space 540 (step 450). The administrative information may define, for example, through a stored list, what applications may access the shared object space 540. Access to the shared object space 540 may also be limited based on the network access being used by an application to access the shared object space 540. For example, an application attempting to access the shared object space 540 via a remote network may be denied access.

Figure 5:
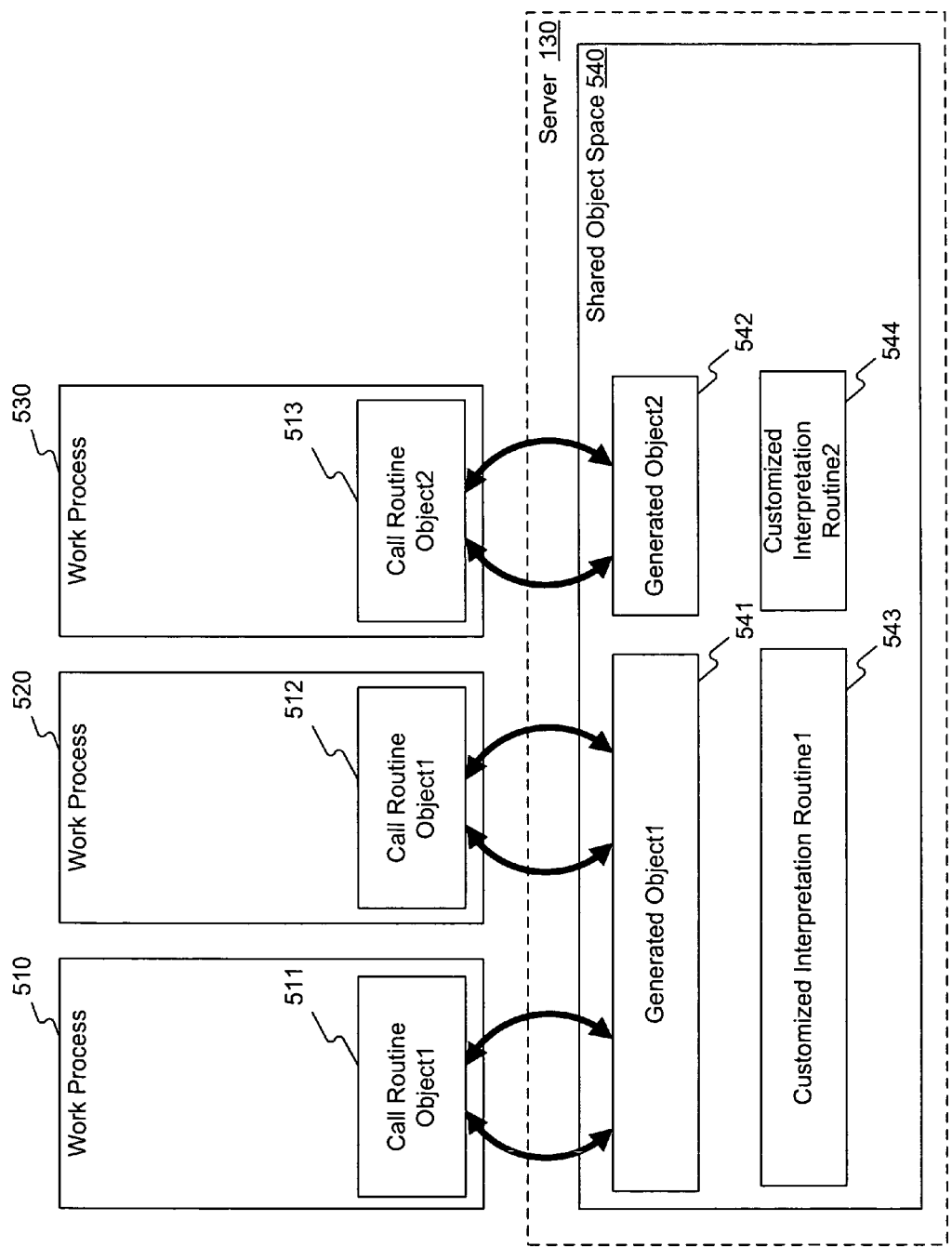
FIG. 5 illustrates an exemplary operation of a shared object space and related processes, consistent with embodiments of the present invention.

FIG. 5 illustrates an exemplary shared object space 540. As discussed above, shared object space 540 may be implemented in a memory area on server 130, which may be accessed by one or more applications. Generated objects, such as generated object1 541 and generated object2 542, along with customized interpretation routines, such as customized interpretation routine1 543 and customized interpretation routine2 544, are stored in the shared object space 540. Also illustrated in FIG. 5 are work processes flows 510, 520, and 530 of an application that may be run on front-end systems 110, for example. The different work process flows 510-530 of the application may comprise call routines 511, 512, and 513, respectively.

In a conventional interpretation process, call routines 511-513 may retrieve an object 200 from the data repository 125 and instantiate the object 200 within the buffer memory of the application. Subsequently, interpreter 131 may retrieve an appropriate interpretation routine from data repository 125 that is capable of generating the object 200 and interpreting the object 200. However, because the object 200 must be instantiated, generated, and interpreted within the buffer memory of the application, the interpretation process of the object 200 is inefficient.

By using the shared object space 540, the efficiency of the interpretation process may be improved. For an existing object 200, a developer may create within the shared object space 540 a generated version of the object, such as generated object1 541 or generated object2 542. The developer may also create customized interpretation routines 543 and 544 for interpreting the created generated objects 541 and 542. Shared object interpreter 132 may process call routines 511-513 for objects 200 and map them to the generated version of the objects stored within the shared object space 540. Because the objects stored within the shared object space 540 have already been generated, the objects do not need to retrieve data from other objects or data repository 125, and may be instantiated directly within the shared object space 540. The instantiation of the generated objects 541 and 542 within the shared object space 540, as opposed to within a buffer memory of the application, may improve the efficiency of the application.

Figure 6:
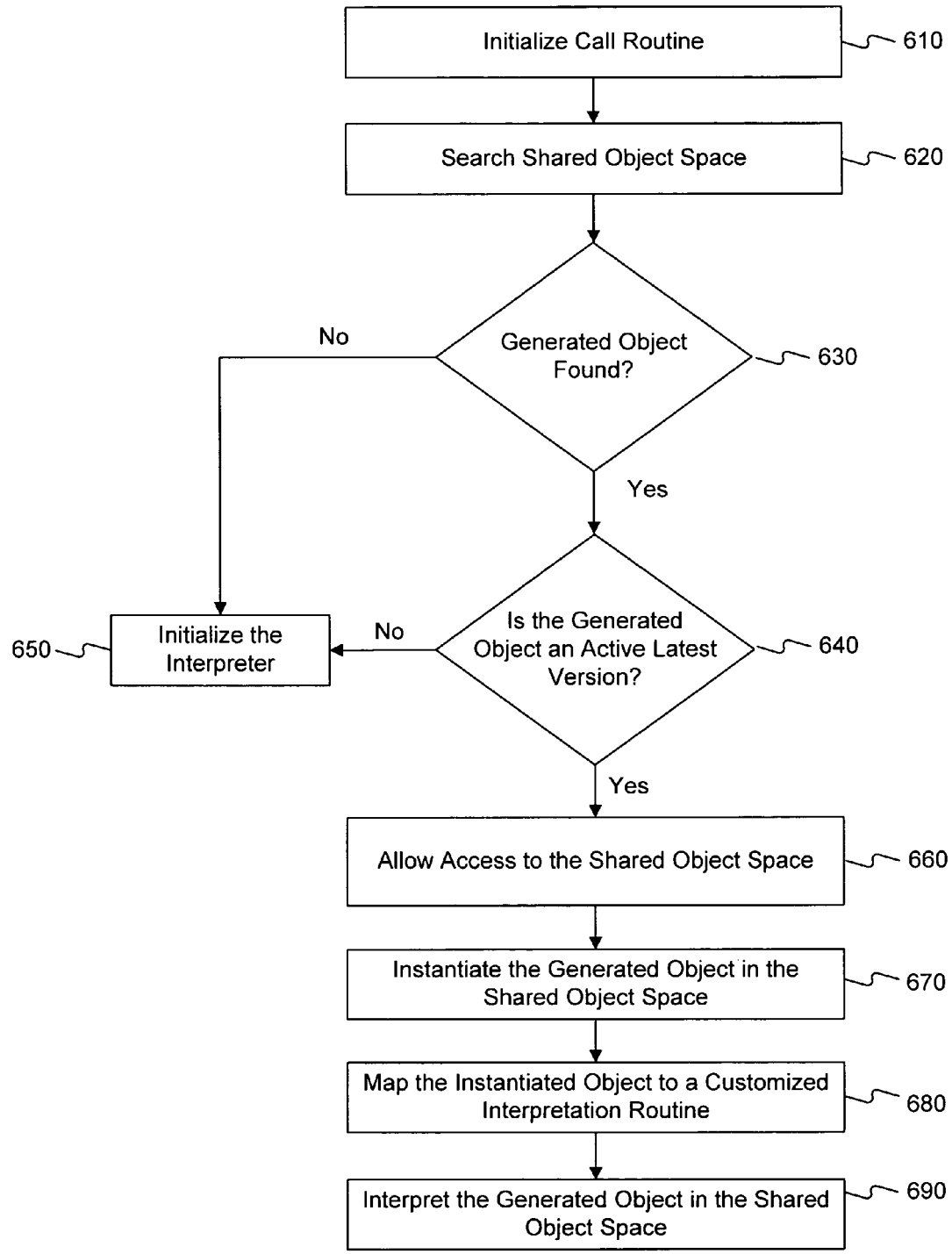
FIG. 6 illustrates a flowchart of an exemplary method for accessing a shared object space and performing a shared object interpretation process, consistent with an embodiment of the present invention.

FIG. 6 illustrates a flowchart of an exemplary method for accessing a shared object space 540 and performing a shared object interpretation process. In an initial step, during the runtime of an application, a call routine (such as 511, 512, or 513) is initialized and calls an object (step 610). The call routine is initially handled by shared object interpreter 132. In the next step, the shared object interpreter 132 searches the shared object space 540 for a generated version of the called object (step 620). Subsequently, a determination is made whether a generated version of the called object is found (step 630). If a generated version of the called object is found, a determination is made if the generated object is the latest version and if it is active (step 640). However, if the generated object is not found, or if the generated object that is found is not the latest version or is inactive, the call routine is handled by the interpreter 131 and the conventional interpretation process is performed (step 650).

In step 640, a check for the latest version of the generated object may be performed, for example, by comparing a time stamp of the generated object against a time stamp of the latest version previously stored within shared object interpreter 132. In addition, a check of whether the generated object is active, may be performed, for example, by checking an attribute or flag within the generated object that may designate the activation status of the generated object. An attribute or flag designating the activation status of a generated object may be useful to provide developers with the ability to continually update, modify, and/or create generated objects. For example, a developer may indicate a partially created generated object as inactive until the creation of the generated object is fully completed.

If the shared object space 540 contains an activated latest version of the generated object, the shared object interpreter 132 may allow the application (i.e., the work process) to access the generated object in the shared object space 540 (step 660). For example, as illustrated in FIG. 5, call routines 511 and 512 of work processes 510 and 520 are the same, and hence, call the same object. Therefore, call routines 511 and 512 are allowed to access the same generated object 541 within the shared object space 540. The call routine 513 of work process 530 calls a different object than that of call routines 511 and 512. Therefore, call routine 513 is allowed to access generated object 542. The work processes 510-530 may then instantiate the generated object(s) in the shared object space 540 (step 670). Subsequently, shared object interpreter 132 may perform the customizing interpretation process of the instantiated generated object by mapping the generated object to a stored customized interpretation routine (step 680). Shared object interpreter 132 may perform the mapping process by retrieving the identification ("technical id") attribute of the instantiated generated object, which may be comprised of a unique string, and searching the shared object space 540 for a customized interpretation routine that matches that identification attribute to interpret that particular instantiated generated object. In the example of FIG. 5, customized interpretation routine1 543 has been assigned to interpret generated object1 541 and customized interpretation routine2 544 has been assigned to interpret generated object2 542. Once the shared object interpreter 132 has mapped the instantiated object to the matched customized interpretation routine, the customized interpretation routine may then interpret the generated object (step 690). Because the generated object is instantiated and interpreted by the customized interpretation routine in the shared object space 540, no unnecessary drain occurs on the system resources of the application.

Figure 7:
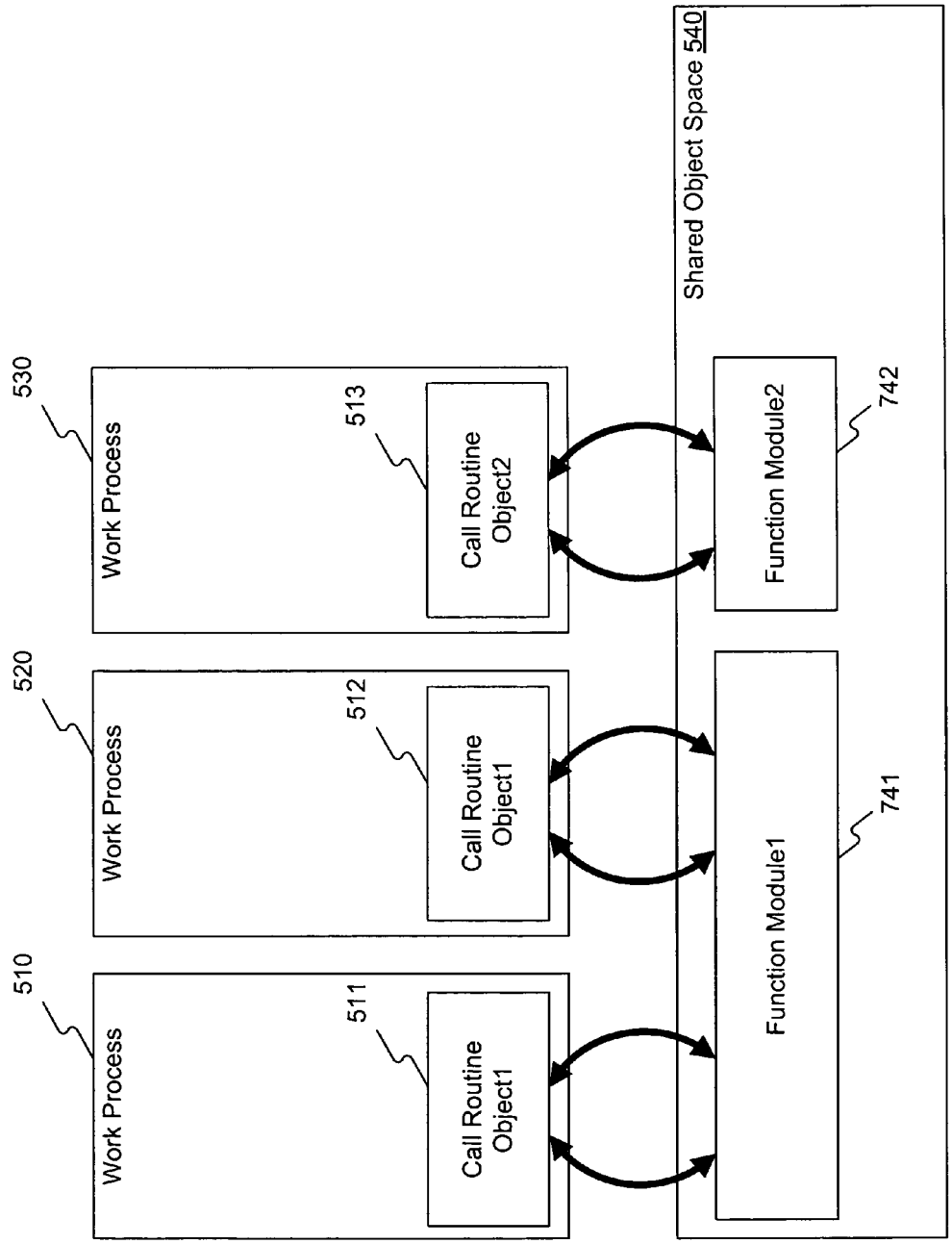
FIG. 7 illustrates another exemplary operation of a shared object space and related processes, consistent with embodiments of the present invention.

FIG. 7 illustrates another exemplary operation of the shared object space 540 and related process. As illustrated in FIG. 7, function module1 741 and function module2 742 are stored in shared object space 540. As used herein, "function modules" are logical containers that include a generated object and a customized interpretation routine that performs the functionalities of the generated object.

Figure 8:
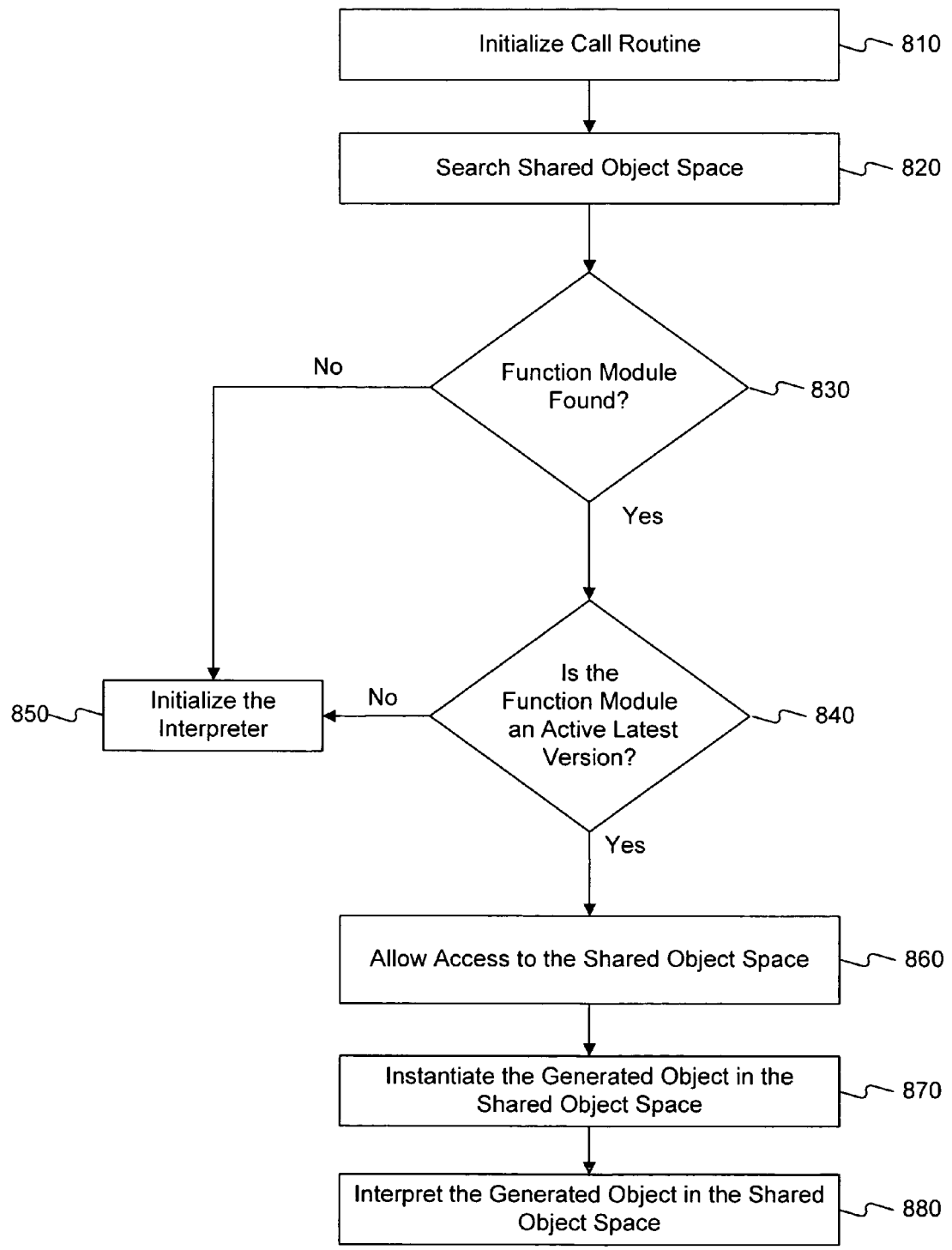
FIG. 8 illustrates a flowchart of another exemplary method for accessing a shared object space and performing a shared object interpretation process, consistent with an embodiment of the present invention.

FIG. 8 illustrates a flowchart of another exemplary method for accessing the shared object space 540 and performing a shared object interpretation process. In an initial step, during the runtime of an application, a call routine (such as 511, 512, or 513) is initialized and calls an object (step 810). The call routine is initially handled by shared object interpreter 132. In the next step, the shared object interpreter 132 searches the shared object space 540 for a function module comprising a generated version of the called object (step 820). Subsequently, a determination is made whether a function module comprising the generated version of the called object is found (step 830). If a function module comprising a generated version of the called object is found, a determination is made if the function module is the latest version and if it is active (step 840). However, if the function module is not found, or if the function module that is found is not the latest version or is inactive, the call routine is handled by the interpreter 131 and the conventional interpretation process is performed (step 850).

In step 840, a check for the latest version of the function module may be performed, for example, by comparing a time stamp of the function module against a time stamp of the latest version previously stored within shared object interpreter 132. In addition, a check of whether the function module is active, may be performed, for example, by checking an attribute or flag within the function module that may designate the activation status of the function module. An attribute or flag designating the activation status of a function module may be useful to provide developers with the ability to continually update, modify, and/or create function modules. For example, a developer may indicate a partially created function module as inactive until the creation of the function module is fully completed.

If the shared object space 540 contains an activated latest version of the function module, the shared object interpreter 132 may allow the application (i.e., the work process) to access the function module in the shared object space 540 (step 860). The work processes 510-530 may then instantiate the function module(s) in the shared object space 540. In response, the function module will instantiate its generated object (step 870). Subsequently, the generated object is interpreted by the customized interpretation routine of the function module (step 880). Because the function module instantiates and interprets the object within the shared object space 540, no unnecessary drain occurs on the system resources of the application.

While illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited to examples described in the present specification or during the prosecution of the application. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method of creating a shared object space, comprising the following operations performed by one or more processors:
   partitioning a memory area of a server, a section of the memory area serving as the shared object space, and the shared object space being separate from a buffer memory of an application;
   creating a pregenerated object configured to:
      contain, within the pregenerated object, all attributes and all data corresponding to the attributes which are needed for performing functions of the pregenerated object; and
      avoid a generating process in which attributes are retrieved from a database or repository outside the pregenerated object;
   providing a customized interpretation routine for interpreting the pregenerated object the customized interpretation routine being correlated with the pregenerated object;
   storing the pregenerated object and the customized interpretation routine in the shared object space;
   defining application access to the shared object space;
   checking the activation status of the pregenerated object based on an attribute or flag of the pregenerated object, wherein the activation status indicates the ability to update, modify or create pregenerated objects;
   instantiating the pregenerated object within the shared memory space; and
   interpreting the pregenerated object using the customized interpretation routine within the shared memory space.

2. The method of claim 1, wherein defining application access comprises including administrative information in the form of a list of applications that are allowed access to the partitioned memory area.

3. The method of claim 1, wherein defining application access comprises limiting access to the partitioned memory area based on a network access being used by an application.

4. A method of using a shared object space to interpret objects, comprising:
   initializing an application call routine to an object;
   searching the shared object space for a pregenerated version of the called object, the pregenerated version being configured to:
      contain, within the pregenerated object, all attributes and all data corresponding to the attributes which are needed for performing all functions of the called object; and
      avoid a generating process in which attributes are retrieved from outside the pregenerated object;
   allowing the application access to the shared object space and the pregenerated version of the called object if the pregenerated version of the called object is found in the shared object space;
   checking the activation status of the pregenerated object based on an attribute or flag of the pregenerated object, wherein the activation status indicates the ability to update, modify or create pregenerated objects;
   instantiating the pregenerated version of the called object in the shared object space, the shared object space being separate from a buffer memory of the application;
   mapping the pregenerated version of the called object to a customized interpretation routine stored in the shared object space, the customized interpretation routine being correlated with the pregenerated object; and
   interpreting the pregenerated version of the called object in the shared object space.

5. The method of claim 4, further comprising retrieving the called object from a data repository if the pregenerated version of the called object is not found in the shared object space.

6. The method of claim 4, further comprising:
   determining whether the stored pregenerated version of the called object is the latest version; and
   allowing the application access to the stored pregenerated version of the called object if the stored pregenerated version of the called object is the latest version.

7. The method of claim 4, further comprising:
   determining whether the stored pregenerated version of the called object is active; and
   allowing the application access to the stored pregenerated version of the called object based on the determination result.

8. The method of claim 4, wherein mapping further comprises:
   retrieving an identification attribute of the pregenerated version of the called object; and
   searching the shared object space for a customized interpretation routine that matches that identification attribute.

9. A shared object space system, comprising:
   a partitioned memory area of a server accessible by one or more applications, a section of the memory area serving as the shared object space and the shared object space being separate from a buffer memory of the one or more applications;

a pregenerated object stored in the shared object space, the pregenerated object being configured to:
- contain, within the pregenerated object, all attributes and all data corresponding to the attributes which are needed for performing functions of the pregenerated object, and
- avoid a generating process in which attributes are retrieved outside the pregenerated object;

an interpretation routine correlated with the pregenerated object for interpreting the pregenerated object; a checking routine correlated with the pregenerated object for checking the activation status of the pregenerated object based on an attribute or flag of the pregenerated object, wherein the activation status indicates the ability to update, modify or create pregenerated objects; and a shared object interpreter component for managing the access of the one or more applications to the shared object space, wherein the shared object interpreter component maps the pregenerated object to the correlated interpretation routine.

10. The shared object space system of claim 9, wherein the pregenerated object and interpretation routine are contained in the same logical container.

11. The shared object space system of claim 9, wherein:
- an application is allowed access to the partitioned memory area when a routine of the application calls an object; and
- a pregenerated version of the called object is stored in the partitioned memory area.

12. The shared object space system of claim 11, wherein the application is allowed access to the partitioned memory area when the pregenerated version of the called object is the latest version.

13. The shared object space system of claim 11, wherein the application is allowed access to the partitioned memory area when the pregenerated version of the called object is active.

14. The shared object space system of claim 11, wherein the application retrieves the called object from a data repository if a pregenerated version of the called object is not stored in the partitioned memory area.

15. A method of using a shared object space to interpret objects, comprising:
- initializing an application call routine to an object;
- searching the shared object space for a function module containing a pregenerated version of the called object and a customized interpretation routine, the pregenerated version being configured to:
  - contain, within the pregenerated object, all attributes and all data corresponding to the attributes which are needed for performing all functions of the called object, and
  - avoid a generating process in which attributes are retrieved from outside the pregenerated object;
- allowing the application access to the shared object space and the function module if the function module is found in the shared object space;
- checking the activation status of the pregentrated object based on an attribute or flag of the pregenerated object, wherein the activation status indicates the ability to update, modify or create pregenerated objects;
- instantiating the pregenerated version of the called object in the shared object space, the shared object space being separate from a buffer memory of the application; and
- interpreting the pregenerated version of the called object in the shared object space using the customized interpretation routine.

16. The method of claim 15, further comprising retrieving the called object from a data repository if the function module containing the pregenerated version of the called object is not found in the shared object space.

17. The method of claim 15, further comprising:
- determining whether the function module is the latest version; and
- allowing the application access to the function module if the function module is the latest version.

18. The method of claim 15, further comprising:
- determining whether the function module is active; and
- allowing the application access to the function module if the function module is active.

* * * * *